No. 699,230. Patented May 6, 1902.
S. PASCO.
APPARATUS FOR TILLING.
(Application filed June 18, 1900.)
(No Model.)
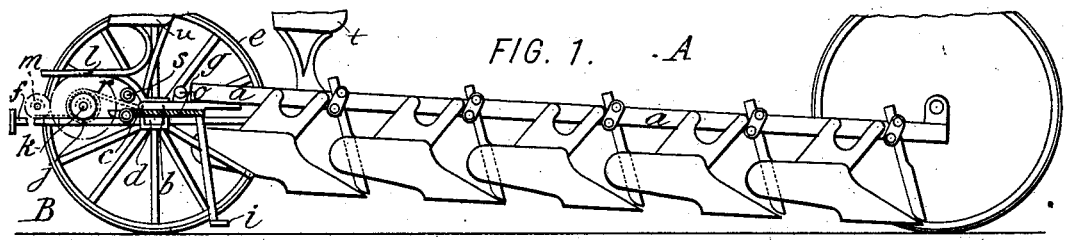
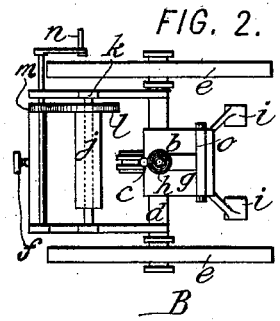
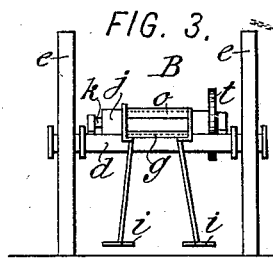
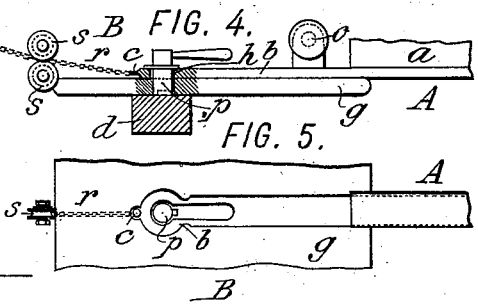
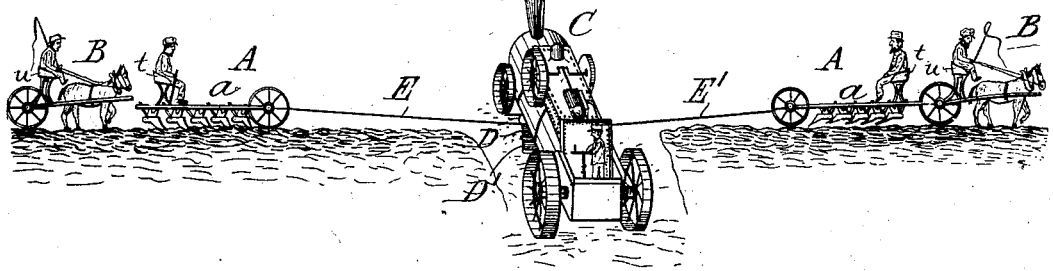
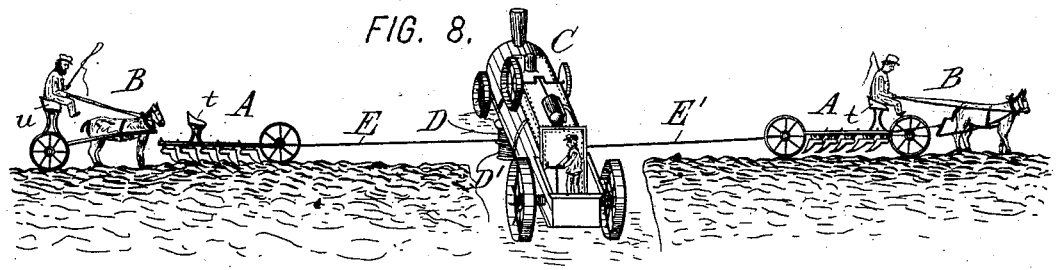
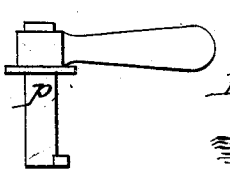
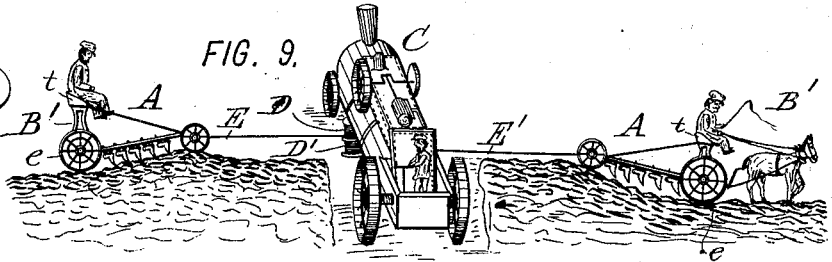
WITNESSES:
Fred White
Thomas F. Wallace
INVENTOR
Serban Pasco
By his Attorneys

UNITED STATES PATENT OFFICE.

SERBAN PASCO, OF JASSY, ROUMANIA.

APPARATUS FOR TILLING.

SPECIFICATION forming part of Letters Patent No. 699,230, dated May 6, 1902.

Application filed June 18, 1900. Serial No. 20,629. (No model.)

*To all whom it may concern:*

Be it known that I, SERBAN PASCO, a subject of the King of Roumania, residing in Jassy, Roumania, have invented new and useful Improvements in Apparatus for Tilling, which invention is fully set forth in the following specification.

My invention relates to tilling land, and provides improved apparatus for tilling lands of large area by means of two plows placed on the right and left hand side of a steam-engine, which actuates them and causes them to operate one after the other, that on the right turning the furrows to the left and that on the left turning them to the right. The two traction-cables of the plows are wound around two drums on the engine in the same direction, which is at the same time that required to cause the engine to advance after the successive arrival of the two plows. The result is that the operation of tilling and the movement of the engine take place without the necessity of reversing the steam-supply and that in this manner an almost, uninterrupted working is obtained. The two drums gear in turn, and when one plow is working, the other, the drum of which is disengaged, is drawn back, unwinding the cable after it by means of animal power or an automobile traction-carriage. The kind of plow to be used will obviously vary according to the nature of the work, the power of the engine, and the nature of the land to be tilled. For example, for beets plows would be employed which work at a depth of about thirty-five centimeters, while for lighter work and in a friable soil or for again turning in the spring land which has been tilled in the autumn plows with smaller but with a larger number of shares would be employed. The only condition to be observed is that the right-hand plow shall turn the earth to the left and the left-hand plow shall turn it to the right. To bring back both the plows into the working position, I employ a special fore-carriage which I have invented for this purpose.

In the accompanying drawings, Figure 1 shows the said fore-carriage attached to a plow having five shares. Fig. 2 is a plan and Fig. 3 a rear view of the said fore-carriage. Fig. 4 is a fragmentary enlarged sectional view cut on the line of the axis of the king-pin $p$, showing the means for coupling the plow and fore-carriage together. Fig. 5 is a fragmentary plan view thereof. Fig. 6 is an enlarged side elevation of the king-pin. Fig. 7 is a perspective view showing the application of my improved fore-carriage with an attendant riding on each plow. Fig. 8 is a similar view in which the advancing plow is not occupied by an attendant and the retreating plow is occupied by the driver of the fore-carriage. Fig. 9 is a perspective view illustrating plowing on a hilly field.

Referring to the drawings, A A indicate the plows.

B B indicate the fore-carriages.

C indicates the engine.

D and D' indicate the windlasses or drums.

E and E' indicate the cables, and B' B' indicate a modified construction of fore-carriage. $t, t'$, and $u$ are seats.

The rear end of the plow-beam $a$ is provided with a slotted tailpiece or end $b$, fitted with a ring $c$ at its rear part.

The fore-carriage proper consists of an axle $d$, mounted upon wheels $e$ and provided with a pole $f$ or with two shafts. Upon the axle $d$ is fixed a plate $g$, provided at its center with a hole $h$ of keyhole shape, said plate being provided also with two feet $i$, designed to rest upon the ground for preventing overturning of the fore-carriage during the operations. The winch carried by the pole-frame consists of a drum $j$, keyed upon the shaft $k$ of a toothed wheel $l$, gearing with a pinion $m$, the spindle of which is provided with a crank-handle $n$. The bar $o$, which is by preference adapted to turn, is arranged above the back of the plate $g$, leaving at this part sufficient space to receive the above-mentioned slotted tailpiece $b$, fixed to the end of the plow-beam. This bar is more especially designed to prevent the relative rocking of the plow and fore-carriage when working. The connection of the two parts is effected by means of a bolt $p$, having a handle (shown detached in Fig. 6) which is inserted in the hole through the tailpiece $b$ on the end of the plow-beam and the hole $h$ in the plate of the fore-carriage.

On the drum $j$ of the winch there is wound a chain $r$, passing between two rollers $s$ and serving to lift the shares out of the ground and hoist the end of the beam onto the fore-carriage. It is for this purpose provided at its end with a hook which can be inserted in the ring c on the tailpiece.

When it is required to bring back the plow, the fore-carriage is brought with its back to the back of the plow, the chain r is hooked to the ring c on the tailpiece b of the plow, and the winch is operated to wind the chain upon the drum and cause the plow to emerge from the furrow. The first movement of the winch causes the fore-carriage to incline backward until its feet i rest upon the ground, and thus give support to the whole. The further rotation of the winch lifts the beam onto the fore-carriage, where it is drawn along on the plate g until the hole in the tailpiece b comes over the hole h, as in Figs. 1 and 4. The bolt p, having a handle, is then engaged in the holes and turned in order to effect the connection of the two parts, the two drivers take their places on the seat of the fore-carriage, and the plow is moved to a fresh starting-point at a speed which may be, for example, six kilometers per hour, the plow when at work traveling much more slowly. The backward travel of an idle plow being quicker than the forward travel of a working plow, the engineer shuts off steam as soon as the latter has arrived, disengages the corresponding drum, engages the other, and puts on steam, thus causing the two plows to work in succession and without loss of time.

A comparison of the systems of plowing heretofore used (except the arrangement wherein the ropes are arranged triangularly and which is complicated and laborious) with my system will show that the latter is very superior, as instead of a double plow with an excessive dead-weight traversing between two engines I propose to use a single engine between two light plows. Owing to this lightening of my plows, the power of the engine can be wholly used for plowing and will not be partially expended in moving a useless dead-weight. This great dead-weight of the double plow requires a large expenditure of force and that the engines shall be very heavy to afford a good grip upon the ground, and as a matter of fact they sink into the ground, break down bridges, tear up the roads, and pass with difficulty even up the slightest incline, and after a little rain it is necessary to apply grapplers to the wheel-rims in order to afford the necessary hold. Gaining in speed what they lose in weight, my simple plows always travel at the maximum speed, thereby performing more work than with the old system, in which the double plow is moved with such difficulty. The engines usually work at a high pressure, which very soon wears them out. With my light plows they can work at lower pressures, which keeps them in a good condition for many years. At present engines are placed at four hundred meters from each other and leave two strips of ten meters not tilled through the necessity which exists of causing the plow to leave the furrow at several meters from the engines by reason of the length of the idle part of the plow, which objection is obviated in my arrangement, in which the plows advance right up to the drums, leaving only the track of the engine untilled. With my system if two hundred meters of cable be taken at the right and left hand side of the engine the same conditions of work are obtained as with the old arrangement, and if four hundred meters be taken double the extent is obtained for a single engine. The present parallel arrangement of two engines, necessitating straight courses, does not allow the double plow situated between them to pass into all the corners of the land, as can easily be done with my improved arrangement and which allows of sending the plows to different distances, Fig. 8. There is the same objection when there is rising ground between the two engines—one cannot always see from one to the other. The expenditure of power becomes exaggerated by reason of the friction of the cable upon the ground, which often causes it to break and gives rise to useless expense. Fig. 9 shows an example of the latter case. A considerable advantage also results from the employment of the engine for performing two kinds of work—that is to say, that when attached to a threshing-machine they move together without necessitating the employment of a score of horses for their transport. Finally to all engines with a double plow I can adapt the second drum for the use of my single plows, by this means providing two apparatuses instead of one.

The preceding description especially relates to the tilling of large farms; but the same method of working is applicable to all other operations for working the land—such, for example, as harrowing, harvesting, &c.

I can adapt a seat upon the fore-carriage in cases where the draft is to be effected by one or two horses attached to the said fore-carriage.

I claim—

1. In a land-tilling apparatus the combination of a fore-carriage which consists of an axle carrying a plate, a plow having a beam which is provided with a tailpiece or end adapted to be connected with said plate, and a bolt or key for connecting said beam to said plate.

2. In a land-tilling apparatus the combination of a fore-carriage which consists of an axle carrying a plate, a plow having a beam which is provided with a tailpiece adapted to be connected with said plate, and a winch on said fore-carriage adapted to hoist the tailpiece of the beam to disengage the shares.

In testimony whereof I have signed this specification in the presence of two subscribing witnesses.

SERBAN PASCO.

Witnesses:
J. ALLISON BOWEN,
RENÉ ARMENGAUD.